(No Model.)
C. COMSTOCK.
VEHICLE.
No. 485,091. Patented Oct. 25, 1892.
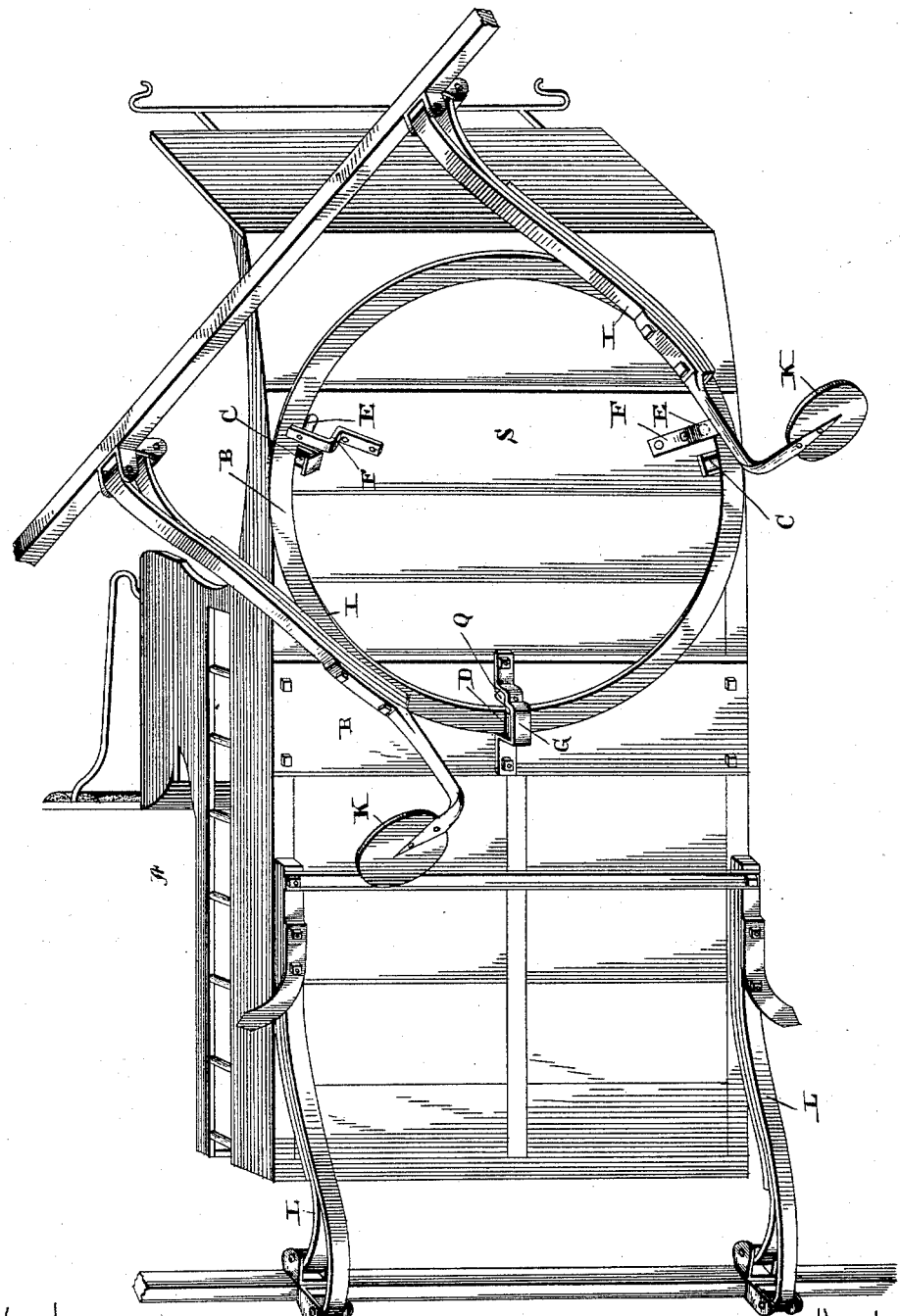
Witnesses—
Geo. E. Frechs.
Roland A. Fitzgerald.
Inventor—
Charles Comstock
per Lehmann Pattison & Neslit
attys.

UNITED STATES PATENT OFFICE.

CHARLES COMSTOCK, OF RICHMOND, VIRGINIA.

VEHICLE.

SPECIFICATION forming part of Letters Patent No. 485,091, dated October 25, 1892.

Application filed December 12, 1891. Serial No. 414,851. (No model.)

*To all whom it may concern:*

Be it known that I, CHARLES COMSTOCK, of Richmond, in the county of Henrico and State of Virginia, have invented certain new and useful Improvements in Vehicles; and I do hereby declare the following to be a full, clear, and exact description of the invention, such as will enable others skilled in the art to which it pertains to make and use it, reference being had to the accompanying drawing, which forms part of this specification.

My invention relates to improvements in vehicles; and it consists in certain novel features of construction and arrangement of parts, which will be fully described hereinafter, and particularly referred to in the claims.

One object of my invention is to provide a king-boltless fifth-wheel for vehicles which is substantially of a diameter equal to the width of the vehicle, whereby the vehicle can be turned more shortly and the construction simplified and the cost reduced, and to secure to this king-boltless fifth-wheel the inner ends of suitable springs, which have their outer ends secured to the front axle, whereby a reach is done away with and the vehicle drawn directly by the front springs, which simplifies the construction and reduces the cost thereof, as will be seen.

Another object of my invention is to construct a vehicle-spring of several leaves and provide the same with two main leaves, which are of substantially the same length, one of the said main leaves being connected to the under side of the axle to which it is fastened and the other main leaf of the same spring being connected either to the inner side or to the top of the axle, as preferred, whereby a double connection is made for the spring, which adds greatly to the strength and durability of the spring against liability to become broken and to afford two securing-points to the axle, which latter prevents the axle from having a turning or twisting movement, which is the case where the springs are secured in the ordinary manner.

A still further object of my invention is to provide a special means for the support and guidance of the fifth-wheel in its turning movement under the vehicle, whereby the springs which are secured thereto are not engaged by the supporting and guiding means, which would interfere with the free movement of the fifth-wheel, and to secure, also, to the fifth-wheel the steps for the driver to mount the vehicle, these steps being so arranged upon the said fifth-wheel that when the front axle is turned to allow a person to get between the wheels the step upon that side is thrown out in position to be used and the other thrown inward under the body of the vehicle.

The accompanying drawing is a perspective view of a vehicle embodying my invention complete, looking from the under side.

A indicates the vehicle-body, which is made of any desired style, to the under side of the front end of which is supported a ring B, which forms a king-boltless fifth-wheel. This ring or fifth-wheel is formed of flat metal, as shown, and rests upon horizontal rollers C, which are suitably journaled to the under side of the body in boxes provided therefor. These rollers are preferably, though not necessarily, formed of gas or other pipe, with a steel core or axle passing through them, which axle is secured in supports fastened to the under side of the body. A suitable number of vertical rolls E engage the inner edge of the ring B and hold the same in position against lateral or sidewise movement, and these rollers are supported by the L-shaped plates F, as shown, which are secured to the under side of the vehicle-body, inside of the ring or fifth-wheel B, and project over the ring, as shown. At the rear side of the ring a roller D is provided for the under side thereof, as will be seen, and this roller D is supported in a substantially-U-shaped plate G, which has its ends fastened by means of bolts or screws to the under side of the body. This plate G is provided with an off-bend H, in which a vertical roller Q is journaled for engaging the inner edge of the ring and guiding the same. As the whole strain of drawing and turning the vehicle is brought upon this ring B and in turn by the ring upon the rollers, the under side of the vehicle is provided with strong boards R and S, to which the rollers are secured, as shown.

By means of the above-described construction I provide a simple and cheap king-boltless fifth-wheel which will allow the vehicle to be turned in a very short space, as will be readily understood. Secured at their inner ends to opposite sides of this ring or fifth-wheel B are the springs I, which extend forward and down and are composed of several leafs. Two of the leaves of each of these springs are what I term "main leaves," which engage each other throughout their length, except at their extreme ends, at which point they are sufficiently separated to have one secured to the under side of the axle and the other to the inner side or the top, as preferred. This construction enables a double connection of each spring to the axle, which greatly strengthens the same and reduces the liability of breaking, while at the same time it prevents the axle from turning or twisting from the strain brought thereon, as is the case ordinarily. By means of the combined construction of the springs and the fifth-wheel I am enabled to bring the vehicle down, so as to make it low, thus doing without a reach, which greatly simplifies and cheapens the construction thereof.

Secured at their inner ends to opposite edges of the rear end of the body are the two rear springs L, which are similar to the two front springs I and are connected to the axle in the same manner that the front springs are. This arrangement greatly simplifies the construction and cost of the vehicle, enabling the reach to be omitted and preventing the rear axle from turning and making a double connection for the rear springs, which strengthens the same.

Secured to opposite sides of the ring B, preferably by the same bolts which hold the inner ends of the springs I, are the steps K, which, being connected with the fifth-wheel, turn with the same. Owing to this fact when one of the front wheels is turned to allow a person to conveniently get into the vehicle without climbing over the wheel the step at that side of the vehicle is turned outward, as shown, where it is convenient to the person to step upon.

From the above construction it will be seen that I produce a vehicle which is very cheap and simple to construct.

Having thus described my invention, what I desire to secure by Letters Patent is—

1. In a vehicle, the body, a fifth-wheel which is substantially the same diameter as the width of the body, and springs which are secured at their inner ends to opposite sides of the fifth-wheel and at their outer ends to the axle, and rear springs which have their inner ends connected with the body and their outer ends connected with the axle, the parts combined substantially as set forth.

2. In a vehicle, the body, a fifth wheel consisting of a ring which is substantially the same diameter as the width of the body, vertical and horizontal rollers upon which it is supported and guided, springs which have their inner ends connected with opposite sides of the said fifth-wheel and their outer ends connected with the front axle, and rear springs, all combined substantially as specified.

3. A king-boltless fifth-wheel for a vehicle, comprising a ring which is substantially the same diameter as the width of the vehicle, horizontal rollers supported by the body above the ring and vertical rollers supported by the body inside of the ring and which engage the inner edge thereof, and springs secured to the fifth-wheel, substantially as specified.

4. In a vehicle, a fifth-wheel comprising a ring formed of flat metal, horizontal rollers above the ring at the under side of the body, a substantially-U-shaped plate at the inner side of the ring, having a horizontal roller below the ring and a vertical roller at the inner edge of the ring, and vertical rollers at the inner edges of the ring, supported by L-shaped plates secured to the body inside of the ring, all combined substantially as specified.

5. In a vehicle, the body, a fifth-wheel comprising a ring, rollers which support and guide the ring, heavy boards at the under side of the body, to which the rollers are secured, front springs secured to the ring and to the front axle, and rear springs, all combined substantially as described.

In testimony whereof I affix my signature in presence of two witnesses.

CHARLES COMSTOCK.

Witnesses:
ALLEN S. PATTISON,
HEATH SUTHERLAND.